May 14, 1929. T. LOWE-LILE 1,712,926
COOKER
Filed April 4, 1928
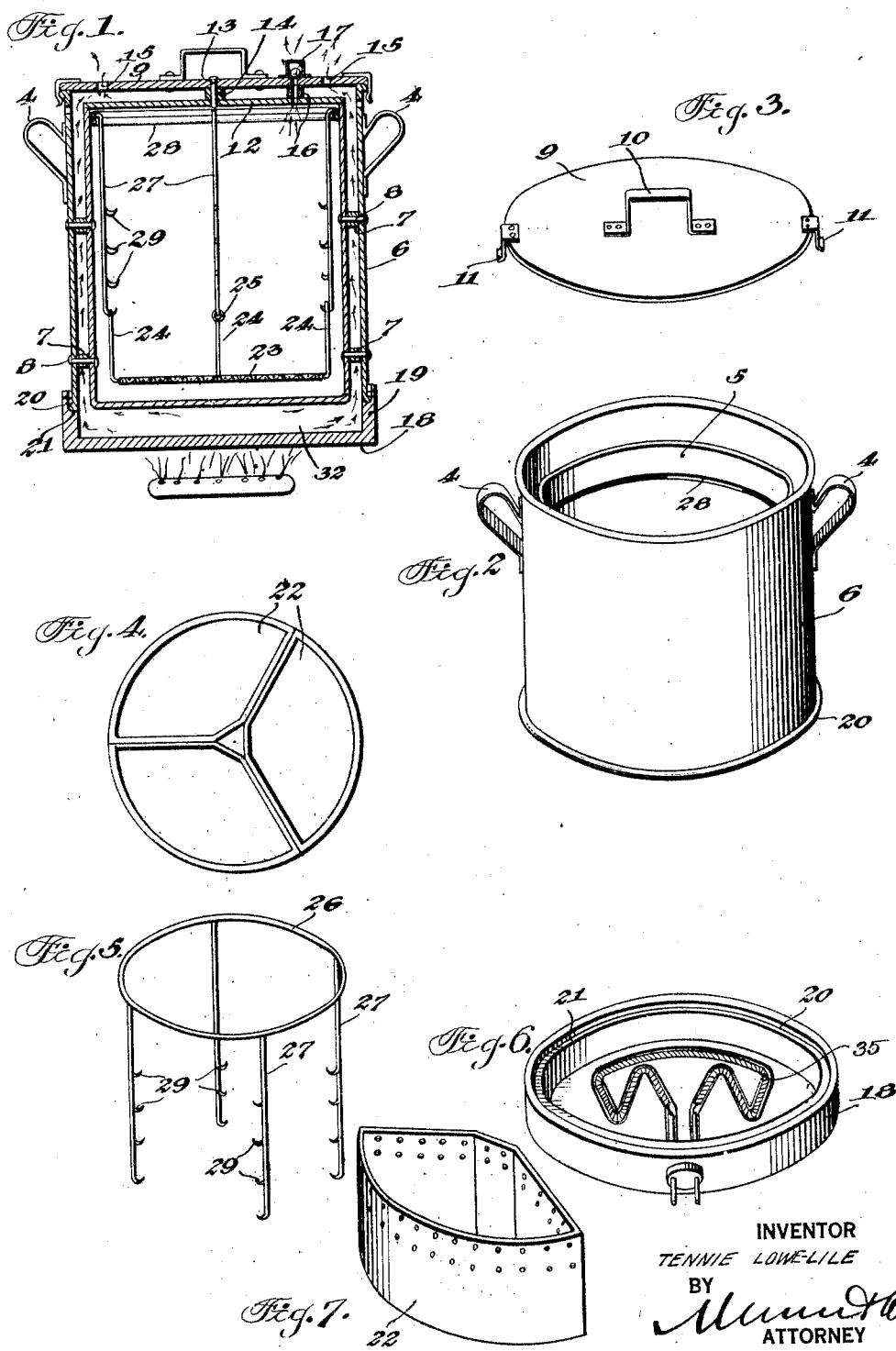
INVENTOR
TENNIE LOWE-LILE
BY
ATTORNEY Patented May 14, 1929.

1,712,926

UNITED STATES PATENT OFFICE.

TENNIE LOWE-LILE, OF RAYMONDVILLE, TEXAS.

COOKER.

Application filed April 4, 1928. Serial No. 267,315.

My invention relates to cookers and an object thereof is to provide a cooker wherein an even degree of heat will be transmitted to the food to evenly cook the latter and at the same time reduce the fuel consumption.

The invention further provides a cooker embodying a vertically adjustable food support whereby the food may be supported at any desired point with respect to the bottom of the cooker.

With the preceding and other objects and advantages in mind, the invention consists in the novel combination of elements, constructions and arrangement of parts to be hereinafter specifically referred to, claimed and illustrated in the accompanying drawings, wherein:

Figure 1 is a vertical sectional view of the cooker in position over a burner;

Figure 2 is a perspective of the same with the cover thereof detached;

Figure 3 is a perspective of the cover for the cooker;

Figure 4 is a top plan view of the food containing receptacles;

Figure 5 is a perspective of the receptacle supporting rack suspension device embodied in the invention;

Figure 6 is a perspective of a modified form of the cooker base or support; and

Figure 7 is a perspective of one of the food compartments or receptacles.

Referring to the invention in detail a cylindrical vessel or receptacle 5, received in and spaced from a cylindrical open ended casing 6, is provided. The side walls of the vessel and the walls of the casing 6 are held in spaced relation by means of spacing elements 7 interposed between the vessel and casing to provide a continuous passage around the vessel. Transverse rivets 8 pass through the casing, spacer elements, and walls of the vessel to secure these parts together. Suitable handles 4 are attached to the cylindrical casing at diametrically opposite points.

A circular cover 9 having a handle 10 is provided for the upper end of the cylindrical casing, and is equipped with resilient latches 11 for engagement with the casing to detachably hold the cover thereon. A cover 12 for the upper end of the vessel is suspended from the cover 9 by a central rivet 13 which passes transversely through these covers. The rivet 13 also passes through a single spacing element 14 interposed between the covers to retain the same in spaced relation. The cover 9 is provided with heat outlet openings 15 to allow for heat expansion between the cylindrical casing and vessel. A check valve 16, interposed between the two covers, communicates with coinciding steam outlet openings 17 whereby steam from the vessel is permitted to exhaust to the atmosphere.

A circular base 18, formed of relatively heavy material, is provided and is formed with an annular flange 19 for supporting the cylindrical casing in a position where the bottom wall of the vessel will be spaced from the base. At its upper edge the inner face of the flange is formed with a circumferential recess 20 for the reception of the lower edge of the casing and defines a horizontal annular shoulder 21 upon which the casing rests.

A plurality of segmental interfitting food receptacles 22 is provided, and for the purpose of supporting these receptacles within the vessel, a circular reticulated shelf is suspended within the vessel. This shelf carries a plurality of radially disposed vertically extending arms 24 terminating in eyes 25 at their upper ends.

To support the shelf at predetermined heights within the vessel a rack is provided comprising a ring or annulus 26 carrying a plurality of radially disposed vertically extending arms 27. In practice the ring or annulus is supported upon a lateral ledge or bead 28, formed upon the interior of the vessel adjacent its upper end, and the eyes 25 engaged with selected hooks 29 projecting laterally from the arms 27, the hooks of each arm being arranged in longitudinal alinement, as illustrated in Figure 5.

As illustrated in Figure 8, the base 18 may be constructed with an electrical heating element 35 for heating the vessel.

With my improved cooker it will be observed that the vessel or receptacle 5 will be completely enveloped in the heat circulating between the cylindrical casing and vessel and thereby evenly cook food contained in the latter.

What is claimed is:—

1. In combination a vessel, a plurality of vertical arms suspended therein, a plurality of longitudinally alined hook elements carried by each arm, and a food supporting shelf in the vessel and suspended from selected hook elements whereby the shelf may be supported at various heights with respect to the bottom of the vessel.

2. In a cooker, a receptacle having an interior ledge adjacent its upper end, an annulus resting upon the ledge, a plurality of radially disposed vertical arms carried thereby and depending within the receptacle, a plurality of hook elements carried by each arm, a food supporting shelf in the receptacle, and upstanding arms carried thereby and terminating in eyes engageable with predetermined hook elements whereby to support the shelf at predetermined elevations within the receptacle.

3. In a device of the character described, a frame to be positioned and supported within a receptacle above the bottom thereof, a plurality of arms depending from the frame, a plurality of hook elements carried by each arm, and a shelf engageable with selected hook elements whereby the former may be supported at predetermined elevations above the bottom of the receptacle.

Signed at Raymondville, in the county of Willacy and State of Texas, this 30th day of March, 1928.

TENNIE LOWE-LILE.